United States Patent Office 3,059,042
Patented Oct. 16, 1962

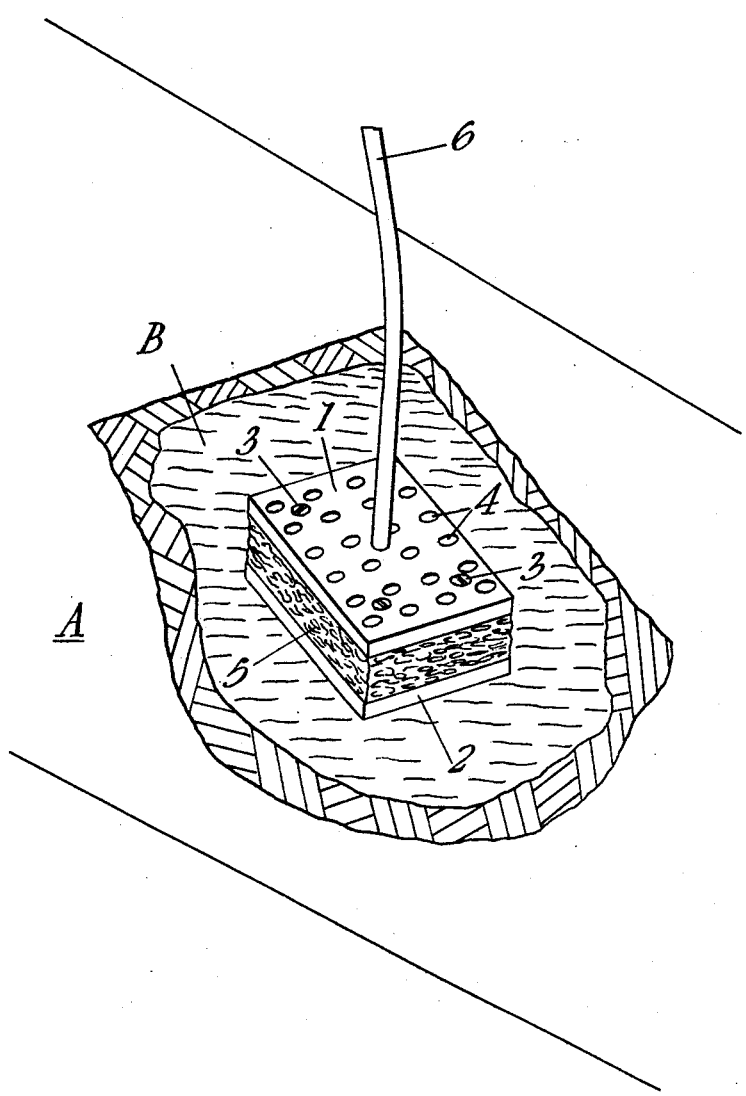

3,059,042
ELECTRICAL EARTHING SYSTEMS
Alfred James Cullinane, Binnegar Farm, East Stoke,
Wareham, Dorset, England
Filed Feb. 13, 1961, Ser. No. 88,979
Claims priority, application Great Britain Feb. 15, 1960
2 Claims. (Cl. 174—6)

This invention relates to electrical earthing systems for the discharge of electricity to earth without danger to life or property, e.g. leakage currents, short-circuit currents, static charge currents or lightning discharge currents liable to occur in overhead electric transmission lines or other installations and more specifically the invention relates to electrical earthing electrodes for use in such systems.

It has been found hitherto that during dry weather the ohmic resistance of such electrical earthing systems rises considerably with the danger that high potentials may result in the system. The cause of this rise in the resistance of the system is believed to be due to the rise in resistance of the soil in contact with the electrode of the system when it dries up.

It is an object of the present invention to provide an electrical earthing electrode, the construction of which is such that the ohmic resistance of the earthing system in which the electrode is embodied does not rise during dry weather to the extent to which the resistance of conventional arrangements rises.

The present invention accordingly consists in an earthing electrode for an electrical earthing system comprising a perforated metallic container containing a salt which will dissolve in water to form an electrically conducting solution, adapted to be embedded in a clayey mass in the ground.

Preferably the metallic container is constituted by two plates bolted one on top of the other with a space therebetween, the upper plate being perforated and the salt being packed in the said space between the plates.

Preferably also the clayey mass in which the container is adapted to be embedded in the ground comprises a compact mass of fine grained hygroscopic clay material comprising calcium montmorillonite, sodium montmorillonite, fireclay, ball clay or china clay which has been treated with an alkali or an acid so that its pH value is approximately seven.

In carrying the present invention into effect, by way of example, according to one convenient mode as illustrated in the accompanying diagrammatic drawing there is provided an electrical earthing system embodying an electrode embedded in the ground A in a compacted mass B of pulverised clay. The electrode comprises two metallic plates 1 and 2 secured together by bolts 3 with a space therebetween, an earthing wire 6 being secured to the plates 1 and 2. The upper plate is perforated at 4. The space between the plates 1 and 2 is tightly packed with muriate of potash 5 or any other suitable salt which is soluble in water to form an electrically conducting solution.

The pulverised clay B in which the electrode is embedded comprises fine grained hygroscopic material comprising calcium montmorillonite, sodium montmorillonite, fireclay, ball clay or china clay, which has been treated with an alkali or an acid so that its pH value is approximately seven.

The arrangement is such that due to the hygroscopic nature of the clay B, during wet weather the clay draws in moisture which dampens the salt 5 in the electrode to render it a good electrical conductor of low resistance when the dry weather comes. The salt is prevented from losing its moisture to the ground because of the water saturated clay in which the electrode is embedded. Therefore unlike conventional earthing systems, the electrode according to the present invention continues to be in contact with material of low resistance during the dry period of the year and accordingly the resistance of the system does not rise to the extent that the resistance of conventional arrangements rises.

It will be appreciated that the foregoing details are given by way of example only and that any desired modifications may be made to the invention within the scope of the appended claims in order to suit varying requirements, for example, the electrode may comprise any suitably perforated metallic container.

What I claim is:
1. In an earthing electrode for an electrical earthing system the combination of two metallic plates bolted on top of each other so as to provide a space therebetween, perforations being provided in the upper plate, and a salt, which will dissolve in water to form an electrically conducting solution, compacted in said space between the metallic plates, the electrode being adapted to be embedded in a clayey mass in the ground.
2. An earthing electrode according to claim 1 wherein the clayey mass in which the container is embedded in the ground comprises a compact mass of fine grained hygroscopic clay material comprising calcium montmorillonite, sodium montmorillonite, fire clay, ball clay, or china clay which has been treated so as to render its pH value 7.

References Cited in the file of this patent
FOREIGN PATENTS
400,739      Great Britain _____ Nov. 2, 1933
1,187,069    France _____ Sept. 7, 1959